United States Patent
McKeown

[15] 3,671,842
[45] June 20, 1972

[54] BATTERY POWERED EXPLOSIVE SYSTEM WITH RELAXATION OSCILLATION IN CHARGING CIRCUIT

[72] Inventor: James E. McKeown, Sidney, N.Y.
[73] Assignee: The Bendix Corporation
[22] Filed: March 22, 1971
[21] Appl. No.: 126,768

[52] U.S. Cl. ................................320/1, 307/109, 321/2, 331/111
[51] Int. Cl. ..................................H03k 3/26, H02m 3/24
[58] Field of Search ............320/1; 307/109, 110; 331/111; 321/2

[56] References Cited

UNITED STATES PATENTS

| | | | |
|---|---|---|---|
| 3,115,610 | 12/1963 | Beguin | 331/111 X |
| 3,173,107 | 3/1965 | Scharf | 331/111 |
| 3,565,080 | 2/1971 | Ide | 331/111 X |

Primary Examiner—Stanley M. Urynowicz, Jr.
Assistant Examiner—Stuart Hecker
Attorney—Raymond J. Eifler and Plante, Hartz, Smith & Thompson

[57] ABSTRACT

An electrical system for firing an explosive bridge wire device or the like which utilizes a battery powered blocking oscillator and a transformer having its primary winding in the oscillator circuit and its secondary winding in the charging circuit of a capacitor.

10 Claims, 2 Drawing Figures

JAMES E. McKEOWN
INVENTOR.

BY R.J. Eifler

ATTORNEY 3,671,842

BATTERY POWERED EXPLOSIVE SYSTEM WITH RELAXATION OSCILLATION IN CHARGING CIRCUIT

BACKGROUND OF THE INVENTION

This invention relates to electrical apparatus and more particularly to a battery powered electrical circuit for charging a capacitor that is used for firing an explosive bridge wire device or the like.

Basically, electrical systems for firing explosive devices includes a source of power, an oscillator, a transformer responsive to the oscillator for stepping up the pulses therefrom, and a capacitor charged by the pulses from the transformer, which supplies the energy to fire an explosive device. The power stored in the capacitor is discharged through a load by means of a triggering circuit. Generally, the impedance of the load varies depending on what form it takes. All too frequently, under heavy loading conditions, existing charging circuits utilizing transformers having a control winding (tertiary), experience high frequency oscillations that affect the operation of the circuit and, therefore, the maximum power that can be transferred to the load. The high frequency oscillations occur because the amount of feedback to the control winding that turns "off" the switching transistor in series with the primary winding depends upon the voltage across the secondary winding in parallel with the load capacitor. At low magnitudes of charge on the load capacitor, the feedback to the control winding is frequently insufficient to overcome a positive bias on the switching transistor. Therefore, the switching transistor is "off" for very short intervals hence, high frequency oscillations.

SUMMARY OF THE INVENTION

This invention provides a battery powered oscillator circuit for charging a capacitor that is not subject to high frequency oscillations as a result of different loads.

The invention is a battery powered capacitor charging circuit characterized by a blocking oscillator which permits the rapid charging of a capacitor and eliminates a change to higher frequency of oscillations when the load is increased. In one embodiment of this invention, the electrical circuit comprises: a source of electrical energy; a transformer having a primary winding connected to the source and a secondary winding connected to a capacitor through a diode; a solid state switch oscillator connected to the source and the transformer to imtermittently interrupt current flow from the source through the primary winding, the solid state oscillator including; a first transistor having collector and emitter terminals in series with the primary winding, the transistor having alternate conductive and nonconductive intervals when current flows through the primary winding; a first voltage divider network connected across the first transistor and the primary winding, the first voltage divider network including first diode means connected to the junction between the primary winding and the first transistor to direct current from the winding in a predetermined manner; and a second voltage divider network connected across the source of electrical energy, the second voltage divider network including a second transistor having alternate conductive and nonconductive intervals to respectively control the conductive and nonconductive intervals of the first transistor whereby the flow of current from said source to said primary winding is periodically interrupted. This circuit eliminates the need for a transformer having a control winding and utilizes a first transistor in series with the winding so that the oscillating circuit is independent of the load on the secondary and the load on the tertiary, if any, of the transformer.

Accordingly, it is an object of this invention to provide a battery powered explosive ignition system that is not adversely affected by the size of the load that it supplies.

It is another object of this invention to eliminate the need for a transformer having a control winding in an electrical system for firing an explosive bridge wire device or the like.

Still another object of the present invention is to provide novel means for maintaining the charge on a storage capacitor or the like with maximum efficiency.

A still further object is to provide apparatus whereby a capacitor or the like electrical energy storage means may be rapidly charged to and maintained at or near a predetermined voltage level with a minimum of input power and a minimum average current flow in the supply circuit.

Another object is to provide a novel electrical system for firing electrically energized squibs and like firing units, such as explosive bridge wire devices.

The above and other objects and features of the invention will become apparent from the following detailed description taken in conjunction with the accompanying drawings and claims which form part of this specification.

DETAILED DESCRIPTION OF THE DRAWINGS

Figure 1:
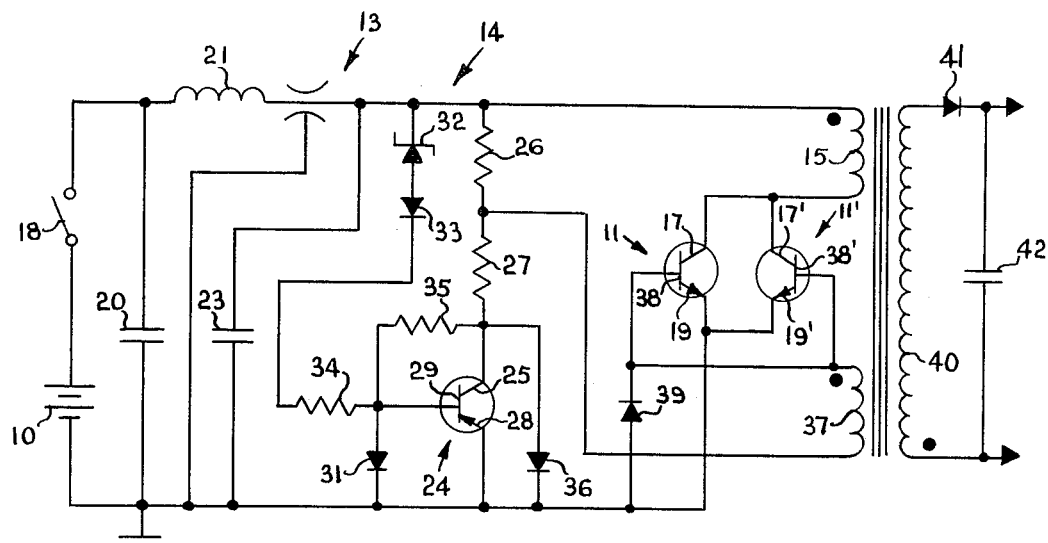
FIG. 1 is a schematic diagram of a prior art oscillator circuit which utilizes a transformer having a control winding.

Turning now to FIG. 1, there is shown a prior art ringing choke inverter circuit powered by a battery 10 or other direct current source, the output voltage of which may vary, by way of example, as in the case of commonly used batteries between 9 and 30 volts. In the circuit shown there are provided an RFI filter, generally designated 13, and a power regulator, generally designated 14, which are interposed in that order between the power source 10 and two transistors 11, 11' connected in parallel in the common emitter mode and functioning as the switching element in the inverter circuit. The transistors 11, 11' which are the NPN-type, have their collectors 17, 17' connected in parallel and to a first end of the primary winding 15 of a transformer 16, the second end of the primary winding 15 being connected to the high voltage side of the power source 10 through the above mentioned RFI filter 13 and a suitable switch 18. The transformer 16 has additionally a secondary winding 40 and a tertiary or control winding 37, the windings 15, 37 and 40 being inductively coupled and wound and disposed in the manner indicated by the dots. The emitter terminals 19, 19' of the transistors 11, 11' are connected in parallel and to the grounded low tension terminal of the battery 10 as shown.

The RFI filter 13, which is of conventional design, includes a choke coil 21 in the high voltage line and condensers 20 and 23 which are connected across the high voltage line on opposite sides of the choke coil to the grounded low voltage side of the current source.

The base terminals 38, 38' of the transistors 11, 11' are connected in parallel and to a first end of the tertiary or control winding 37 of the transformer 16. The second end of the tertiary winding 37 is connected to the first ends of series connected resistors 26 and 27. The second end of resistor 26 is connected to the high voltage line of the power source; the second end of the resistor 27 is connected to the power regulator 14 in the manner now to be described. The transistor 24 of such power regular functions as a variable resistor in series with the resistor 27, and thus variably biases the bases 38, 38' of the transistors 11, 11'.

The power regulator 14 includes the transistor 24, which is the PNP-type and is connected in the common emitter mode. The collector terminal 25 of transistor 24 is connected to the second end of the resistor 27. The emitter 28 of transistor 24 is connected to the low voltage side of the current source 10, and the base terminal 29 of transistor 24 is connected to the high voltage side of the current source through a resistor 34, and reversely polarized diode 33 and Zener diode 32 in that order. Resistor 34 limits the flow of current through the Zener diode 32 and the base terminal of the transistor 24. The base terminal 29 is connected to the collector terminal 25 through a resistor 35; the base terminal also being connected to the low voltage side of the current source through a diode 31.

The collector terminal 25 of transistor 24 is connected to the low voltage side of the current source through a diode 36 which is polarized in the same direction as the diodes 31 and 33. The base terminals 38, 38' of transistors 11, 11' are connected to the low voltage side of the current source through a diode 39 which has its cathode connected to the base of the transistor.

The transformer 16 has a secondary winding 40 which is connected across a load such as an untimed dual ignition circuit. The ignition circuit comprises a diode rectifier 41 in a first lead wire from the secondary winding 40 and a relatively large tank capacitor 42 which is connected across the ends of the secondary winding 40 beyond the diode 41.

The disclosed circuit functions as follows: The transistors 11, 11' which as noted are of the NPN-type, are conductive when their base voltage exceeds the emitter voltage plus the $b-e$ voltage drop (0.7 v.), are nonconductive when the opposite occurs. The circuit parameters, that is, the values of the resistors 26 and 27, the resistances of primary winding 14 and tertiary winding 37, and the characteristics of diodes 36 and 39 are such that when the switch 18 is closed the transistors 11, 11' are conductive. Electrical energy drawn from the battery 10 is stored in the primary winding 15 of the transformer 16 during the "on" or conduction period of the transistors 11, 11'. As the conduction period begins, the transistors 11, 11' are driven into saturation, and a constant voltage appears across the primary 15 of the transformer 16. Because of the inductance of the transformer, the constant primary voltage thereof produces a linearly rising current in the primary 15, and such current, in turn, induces a constant voltage in the base or tertiary winding 37 and the secondary winding 40 of the transformer 16. Since the polarity of the voltage induced in the secondary winding 40 does not allow the rectifier 41 to conduct, such secondary winding 40 is open circuited. The base voltage of the transistors 11, 11' produces a constant base current that determines the maximum current flowing through the primary 15 of the transformer 16 and the collectors 17, 17' of the transistors 11, 11'.

Since the base current is constant during the conduction period of the transistors 11, 11', the linearly rising collector current will reach a value equal to $\beta \cdot I_b$. At this time the voltage induced in the primary 15 of the transformer 16 will drop to zero, since the collector current cannot exceed $\beta \cdot I_b$. This drop in the voltage induced in the primary winding 15 starts a regeneration action which drives the transistors 11, 11' into the cutoff region. As the current flowing through primary winding 15 drops, the polarity of the voltage induced in the secondary winding 40 of the transformer 16 is reversed, allowing the diode 41 to conduct and to supply energy to the tank capacitor 42 and to the load (not shown). Thus electrical energy which is fed to the primary winding 15 during the conducting period of the transistors 11, 11' is transferred to the load circuit during the nonconducting period of the transistors 11, 11'.

As the current flowing through primary winding 15 drops, the voltage induced in the control or tertiary winding 37 is also reversed; such reversal of the voltage in winding 37 holds the transistors 11, 11' in their nonconducting condition. Such reverse voltage condition in winding 37 remains until the energy stored in the transformer 16 is transferred to the tank capacitor 42. The inverter circuit is thus restored to its initial condition, and its above described operating cycle is then repeated.

The output power of the inverter circuit depends upon the time ($T_{on}$) in the cycle during which the transistors 11, 11' are conductive. $T_{on}$, in turn, is dependent upon the value of the base resistor 27. The output power and the output voltage will vary according to the beta of the transistors 11, 11'. The power regulator 14 provides, in effect, a variable resistor the resistance of which increases as the input voltage increases, so as to maintain the base current $I_b$ of the transistors 11, 11' substantially constant.

In the ringing choke-inverter, if the pulse width ($T_{on}$) is varied inversely as the input voltage, that is, when the input voltage increases, the pulse width of the oscillator decreases, the total energy per pulse stored in the primary winding of the transformer remains constant and a constant energy per pulse, which is independent of the input voltage, is transferred to the output capacitor. The output is proportional to the energy stored per pulse times the frequency.

In an ignition system such as that shown, the load configuration may be such that the turn-off time of the inverter is always constant, since it is essentially determined by discharge circuit parameters. Thus, the output power of the inverter can be kept constant by varying the pulse width ($T_{on}$) as the input voltage increases. Since the energy stored in the primary winding is independent of the input voltage, input power requirements will also be constant.

As described above, if the pulse width ($T_{on}$) is varied inversely as a function of the input voltage, the energy stored in the primary of the transformer is independent of the input voltage. In the ringing choke-inverter, the pulse width ($T_{on}$) can be varied inversely as a function of input voltage by increasing the value of the base resistance as the input voltage increases. The transistor 24 of the power regulator, when operated in the active region, acts as a variable resistor. By reverse biasing the base of transistor 24 as the input voltage increases, the collector current of such transistor will decrease from a high value to a lower value and the voltage across the transistor will increase, thus simulating a variable resistor the resistance of which increases as the input voltage increases.

As the resistance of the base circuit of the transistors 11, 11', i.e., the resistance of the power regulator 24 increases, the base circuit current $I_b$ decreases; this results in a low collector current and hence a lower circuit input current (average input current), thus keeping the input power almost constant. Since the energy stored in the primary winding of the transformer is independent of the input voltage and is constant, the output power also remains constant.

In order to compensate for the variations in the beta of different transistors 11, 11' which may be employed, the tolerances of the tank capacitor 42, the load voltage and temperature variations, a variable base resistor 27 can be used. Such resistor 27 can be adjusted to give the desired output power at the minimum input voltage. The power regulator then causes the input power and the output power to remain constant despite variations in the voltage of the power source 10.

In the disclosed circuit, the power regulator consists of the transistor 24, Zener diode 32, and resistors 35 and 34. The Zener diode voltage is selected to be equal to the minimum input voltage so that transistor 24 almost saturates at the minimum input voltage. As the input voltage is increased, the Zener diode 32 conducts, and reverse biases the transistor 24 which results in a lower collector current and higher voltage across the transistor 24. The diode 31 clamps the base to emitter voltage of transistor 24 to a voltage which is appreciably less than the specified ratings of such transistor, thus safeguarding the transistor from damage.

Examples of other capacitor charging and discharge circuits for use in an electric system for firing an explosive bridge wire device or the like may be found in U.S. Pat. No. 3,275,884 titled "Electrical Apparatus For Generating Current Pulses" to L. H. Segall et al. and U.S. Pat. No. 3,417,306 titled "Regulated Voltage Capacitor Discharge Circuit" to J. L. Knak.

Figure 2:
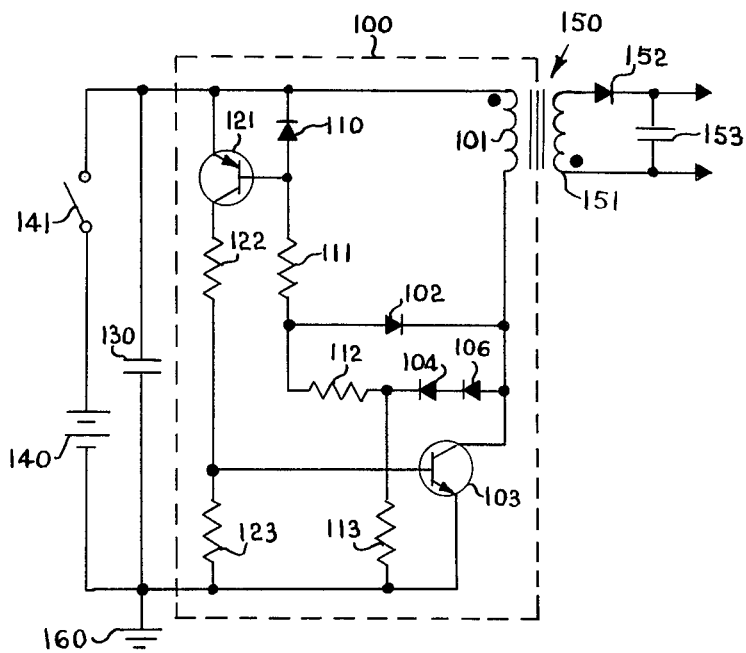
FIG. 2 is a schematic diagram of a batter powered explosive ignition system that accomplishes the objects of this invention.

FIG. 2 illustrates a preferred embodiment of the circuit that embodies the principles of this invention. The description of the prior art circuit shown in FIG. 1 is given so that the functional objects, functional distinctions, and economic advantages of this circuit will be more readily appreciated.

A solid state switch oscillator 100 (blocking oscillator) shown within the dotted lines is powered by a battery 140 or other direct current source. In one embodiment 12½ volt batteries were used, which, because of the internal resistance thereof, provided a voltage between 10 to 12 volts. Connected across the battery 140 is a capacitor 130 which, when charged, provides additional current to the oscillator 100. A transformer 150 has its primary winding 101 connected into the oscillator circuit 100 and its secondary winding 151 connected to a capacitor 153 through a diode 152 to store the energy generated by the oscillator 100, the windings 101 and 151 of the transformer 150 being inductively coupled and wound and disposed in the manner indicated by the dots.

The solid st ate switch oscillator 100 operates to intermittently interrupt current flow from the batter 140 through the primary winding 101 of the transformer 150 and includes a first switching transistor 103, a first voltage divider network (110, 111, 112, 113), a second voltage divider network (121, 122, 123), and first diode means (102, 104, 106) connected between the first voltage divider network and the primary winding 101 of the transformer 150 to direct the flow of current to and from the primary winding 101. The oscillator circuit shown is capable of producing oscillations in the range of 800 to 2,000 Hz.

The first voltage divider network includes a diode 110 and a plurality of resistors 111, 112 and 113 connected together in series across the primary winding 101 of the transformer and the first transistor 103.

The diode means that directs the current from the primary winding 101 include a first diode 102 connected by its anode terminal to the junction between resistor 111 and resistor 112 and its cathode connected to the junction between from the primary winding 101 and the first transistor 103. To permit current to flow from the primary winding 101 when transistor 103 is "off," diodes 104 and 106 are connected in series with one anode terminal connected to the junction between the primary winding 101 and the first transistor 103 and one cathode terminal connected to the junction between the second transistor 112 and the third resistor 113.

The second voltage divider network includes a transistor 121, a resistor 122, and a resistor 123 connected together in series across the battery 140. The base of the first transistor 121 is connected, for biasing purposes, to the junction between the diode 110 and resistor 111 of the first voltage divider network. The base of the first transistor 103 is connected to the junction between resistors 122 and 123 to supply a current to the base of the transistor 123 when the transistor 121 is in the conductive state.

The secondary winding 151 of the transformer 150 is connected to a diode 152 and a capacitor 153. When the battery 140 is 10 to 12 volts, the maximum charge that can be obtained on capacitor 153 is about 7,000 to 8,000 volts. However, voltages of this magnitude are not generally required in battery powered explosive ignition systems, therefore, an additional circuit (not shown) may be added to limit the voltage across the capacitor 153. The energy stored in the capacitor 153 is used for firing an explosive bridge wire device or the like.

In this embodiment, when a constant current source having an output voltage of about 10 volts is used in lieu of the battery 140 and the capacitor 153 is a 100-microfarad capacitor, the capacitor 153 can be charged to 200 joules within 10 seconds and to 400 joules within 20 seconds. Since batteries deteriorate with used, they are cable of achieving the initial charged energy previously stated, but tests reveal that when they are used to charge the capacitor 153 to 400 joules three times a day for 21 days, it would take a maximum of 71 seconds of charge time to obtain 400 joules of energy at the capacitor 153. The minimum charge time at the end of this period to obtain 400 joules of energy at the capacitor 153 would be 49 seconds.

OPERATION

Referring now to FIG. 2, the circuit operates as follows: When switch 141 is closed, current flows from the battery 140 through capacitor 130 and through transistor 121, resistor 122 and resistor 123. When the switch 141 is closed, a voltage is applied across the voltage divider network containing transistor 121 and the voltage dividing network containing diode 110. Since there is a positive voltage applied across the emitter base circuit of the transistor 121, the transistor 121 conducts permitting a current to flow through resistors 122 and 123 and through a lead to the base of transistor 103 which is in the nonconducting state. When the current to the base of transistor 103 is sufficient, transistor 103 conducts (ON). When the transistor 103 conducts, current flows through the transformer primary winding 101 and transistor 103. With current flowing to ground through the transistor 103 and primary winding 101, transistor 121 begins to return to the nonconductive (OFF) state as the base to emitter current of that transistor begins to decrease. Eventually transistor 121 becomes nonconductive, removing the necessary base current to transistor 103 which also becomes nonconductive (OFF). Once the transistor 121 turns OFF, the electrical energy stored in the primary winding 101 during the ON or conduction period of transistor 121 is removed as current leaves the primary winding 101 and flows through diodes 104, 106,110 and resistors 111 and 112. This action also operates to back bias resistor 121 so that it remains in the nonconductive state. Further, since during this time the rate of change of current with respect to time ($di/dt$) becomes sharply negative the voltage induced across the secondary winding 151 for this period also reverses and the secondary winding 151 becomes a current source. Therefore, during the time $di/dt$ is negative, most of the energy stored in the primary winding of the transformer is transferred to the secondary winding 151 in a manner that allows the diode 152 to conduct and to supply energy to the capacitor 153 and to supply energy to the capacitor 153 and to a load (not shown). Thus, electrical energy which is fed to the primary winding during the conducting period of transistor 103 is transferred to the capacitor 153 during the nonconducting period of transistor 103. The entire action is cyclic for as the energy is removed from the transformer 150 the reverse bias on transistor 121 is removed allowing transistors 121 and 103 to turn "on" and repeat the entire operation again. (About) 800 to 2,000 Hz.)

In one satisfactorily operable system powered by twelve E 95 batteries (having an output voltage ranging from 10 to 12 volts) and including a capacitor 153 to be charged to and maintained at a voltage within the range of 2,000 to 2,500 volts the following elements of the arming circuit had the values or were of the types indicated below:

| | |
|---|---|
| Resistor 122 | ohms 6.2 |
| Resistor 123 | ohms 33 |
| Resistor 111 | ohms 100 |
| Resistor 112 | ohms 1K |
| Resistor 113 | ohms 10K |
| Capacitor 130 | 3300 Mfd., 30v |
| Capacitor 153 | 100 Mfd., 3 kv. |
| Diode 110 | Type GEA14F |
| Diode 102 | Type GEA14F |
| Diode 104 | Type GEA14F |
| Diode 106 | Type GEA14F |
| Diode 152 | Type MR995A |
| Transistor 103 | Type 2N3055 |
| Transistor 121 | Motorola Type MJE 371 |
| Primary 42 T. #15 | volts 120 |
| Secondary 1500 T. #29 | volts 18000 |

There is thus provided a novel and useful apparatus and method for charging and maintaining a charge on an electrical condenser or the like with maximum efficiency and safety. The novel system provided is adapted to many uses other than the ignition of explosive bridge wire type, shunted surface gap type, and other types of initiators or squibs. In addition, the system is flexible and yet extremely reliable under a wide range of temperatures. It may be packaged in a small space and is rugged and hence capable of withstanding vibrations of considerable magnitude in normal usage.

Although only a single embodiment of apparatus including the invention has been illustrated in the accompanying drawing and described in the foregoing specification, it is to be expressly understood that the invention is not limited thereto. For example, many variations which will now be apparent to those skilled in the art may be made in the types of components and the values thereof above suggested. For example, it will be apparent to skilled artisans that different types of semi-conductive or solid state switching devices may be substituted for the types illustrated and that suitable variations may be made in the circuitry to accomplish the desired result in accordance with the novel method disclosed. Other known types of sources of electrical energy may be substituted for the battery 140.

Having described the invention, what is claimed is:

1. Electrical apparatus comprising:
    a source of electrical energy;
    a transformer having a primary winding connected to said source and a secondary winding;
    first diode means and electrical energy storage means connected together in series across said secondary winding to store energy generated by the current flowing through said primary winding;
    a solid state switch oscillator connected to said source and said transformer to periodically interrupt flow from said source through said primary winding, said oscillator including;
    a first transistor having collector and emitter terminals in series with said primary winding, said transistor having alternate conductive and nonconductive intervals to periodically interrupt the current flowing from said primary winding;
    a first voltage divider network connected across said first transistor and said primary winding, said first voltage divider network including second diode means connected from said first voltage divider network to the junction between said primary winding and said first transistor to direct current from said winding in a predetermined manner; and
    a second voltage divider network connected across said source of electrical energy, said second voltage divider network including a second transistor having alternate conductive and nonconductive intervals to respectively control the conductive and nonconductive intervals of said first transistor whereby the flow of current from said source to said primary winding is periodically interrupted causing current to flow in an oscillatory manner through said primary winding.

2. The electrical apparatus as recited in claim 1 including a second capacitor connected across said source of electrical energy.

3. The electrical apparatus recited in claim 1 wherein said first voltage divider network comprises:
    a diode having a first terminal connected to the junction between said primary winding and said source of electrical energy and a second terminal connected to the base of said second transistor;
    a first resistor in series with the second terminal of said diode;
    a second resistor in series with said first resistor; and
    a third resistor in series with said second resistor and having one terminal connected to the junction between said first transistor and said source of electrical energy.

4. The electrical apparatus recited in claim 3 wherein said second diode means connected to said junction between said primary winding and said first transistor is also connected to said junction between said first and second resistor and said junction between said second and third resistor.

5. The electrical apparatus recited in claim 3 wherein said second diode means includes:
    a first diode having its anode connected to the junction between said first and second resistor and its cathode connected to the junction between said primary winding and said first transistor; and
    at least one other diode having its anode connected to the junction between said primary winding and said first transistor and its cathode electrically connected to the junction between said second and said third resistor.

6. The electrical apparatus as recited in claim 3 including a second capacitor connected across said source of electrical energy.

7. The electrical apparatus as recited in claim 1 wherein said source of electrical energy is a direct current source.

8. The electrical apparatus as recited in claim 7 wherein said source of electrical energy is at least one battery.

9. The electrical apparatus recited in claim 8 including electrical energy storage means connected across said second voltage divider means.

10. The electrical apparatus as recited in claim 8 including a second capacitor connected across said source of electrical energy.

* * * * *